United States Patent [19]

Hill

[11] Patent Number: 5,733,489
[45] Date of Patent: Mar. 31, 1998

[54] METHOD OF PRODUCING TITANIUM SUBOXIDE ARTICLES

[76] Inventor: Andrew Hill, 2 Holly Court, Bramcote, Nottingham, NG9 3DZ, United Kingdom

[21] Appl. No.: 615,211

[22] PCT Filed: Sep. 12, 1994

[86] PCT No.: PCT/GB94/01987

§ 371 Date: Mar. 13, 1996

§ 102(e) Date: Mar. 13, 1996

[87] PCT Pub. No.: WO95/07868

PCT Pub. Date: Mar. 23, 1995

[30] Foreign Application Priority Data

Sep. 13, 1993 [GB] United Kingdom ............... 9318907

[51] Int. Cl.[6] .................................................. C04B 35/46
[52] U.S. Cl. .................... 264/125; 264/604; 264/614; 264/669; 264/681; 264/109; 264/332
[58] Field of Search ................ 264/65, 125, 332, 264/109, 604, 669, 681, 614

[56] References Cited

U.S. PATENT DOCUMENTS

| 3,639,132 | 2/1972 | Egerton et al. | 106/39 |
| 4,252,629 | 2/1981 | Bewer et al. | 204/290 |
| 4,422,917 | 12/1983 | Hayfield | 204/196 |
| 4,931,213 | 6/1990 | Cass | 252/507 |
| 5,281,496 | 1/1994 | Clarke | 429/218 |

FOREIGN PATENT DOCUMENTS

| 0047595 | 3/1982 | European Pat. Off. . |
| 2752875 | 5/1979 | Germany . |
| 9214683 | 9/1992 | WIPO . |

*Primary Examiner*—James Derrington
*Attorney, Agent, or Firm*—Caesar, Rivise, Bernstein, Cohen & Pokotilow, Ltd.

[57] ABSTRACT

A method of making an article which includes a suboxide of titanium, the method involving binding Magneli phase powder into the shape of an article and subjecting the bonded shape to heat treatment including the step of controlling the temperature and pressure of the heat treatment so that the heat treated article is substantially corrosion resistant and non-wicking in use.

10 Claims, No Drawings

METHOD OF PRODUCING TITANIUM SUBOXIDE ARTICLES

The invention relates to the production of articles comprising suboxides of titanium, in particular Magneli phase oxides of the formula $TiO_x$ where x is 1.55 to 1.95.

EP-A-047595 discloses a method of making an article comprising a suboxide of titanium, the method comprising, preparing the suboxide from ititanium dioxide by reduction in hydrogen and carbon; binding the suboxide into the shape of an article; and subjecting the bonded shape to a heat treatment.

Articles of these suboxides can be used as electrodes in electro chemical processes and for a variety of industrial purposes. The articles can be used for example in electrodialysis, as metal recovery devices and as self-cleaning electrochlorinators. Such articles tend to be porous and therefore wicking of electrolyte on to a ceramic-metal junction at a connection point can be a problem. We have now discovered how to make articles of the suboxides which are characterised by the unique combination of being resistant to chemical corrosion and non-porous or pore-free to the extent that the problem of wicking is avoided. This invention is based on the discovery that this combination of properties may be achieved by controlling the parameters of a heat treatment.

According to the invention in one aspect there is provided a method for the purpose specified comprising binding Magneli phase powder into the shape of an article and subjecting the bonded shape to heat treatment characterised in that the heat treatment is carded out at from about 1100° C. to about 1200° C. and a pressure of from about 3000 (20685 Pa) to about 5000 psi (34475 Pa) and over from about 3 hours to about 6 hours whereby the heat treated article is substantially corrosion resistant and non-wicking in use.

According to the invention in a more specific aspect there is provided a method of making a substantially corrosion resistant and non-wicking article comprising a titanium suboxide, the method comprising the steps of: mixing a Magneli phase powder and a binder therefor to form a preform, removing the binder and subjecting the preform to heat treatment characterised by controlling the temperature and pressure and time as defined above whereby the heat treated article is substantially corrosion resistant and non-wicking in use.

Our investigations suggest that the pressure and temperature are inversely related. It is preferred to operate at the maximum pressures possible with available equipment, such as from about 3000 (20685 Pa) to about 3500 psi (34475 Pa), depending on the size of the workpiece and the mechanical capabilities of the press. This permits the pressing times to be minimised. At these pressures, temperatures in the range of from about 1100° to about 1150° C. can advantageously be used and the pressing can be completed within a working day.

Temperatures for the heat treatment should not exceed about 1200° C. While higher temperatures were expected to reduce necessary pressing times without undue adverse affects, we have found that higher temperatures make the product susceptible to corrosion.

In one overall preferred method according to the invention, relatively porous powdered Magneli phase titanium suboxide is first prepared from titania, using hydrogen or carbon reduction, for example as disclosed in U.S. Pat. Nos. 4,422,917 and 5,173,215 the contents of each of which are hereby incorporated by reference. The powder is preferably between about 1 and 80 microns average diameter, more preferably between 1 and 15 microns. The powder is combined with a low residue binder, e.g. a polymeric binder such as methyl cellulose, or polyester based materials in a solvent therefor, and shaped, e.g. cast or laid up into a preform such as a flat sheet or tape strand. Thinner preforms, for example 1 to 2 mm, are preferred to ensure that the material is completely densified during processing. The preform is then held at about 300° C. at slightly elevated pressure for sufficient time to remove the binder. The binder-free precursor is then subjected to the heat treatment. For this the tape is laid to the appropriate thickness on carbon platens in a uniaxial press, such as a press made by KCE Sondermaschinen of Rodental Germany. It is then uniaxially pressed to 3000 (20685 Pa) to 3500 psi (24132 Pa) and at a temperature less than 1200° C., and preferably at about 1150° C. under an inert atmosphere. It is held at temperature for 6 hours and then slowly cooled.

In another method of the invention, porous Magneli preforms, such as plates, are first encapsulated (or the surface pores are sealed) and then subjected to hot isostatic pressing ("hipping") in a high pressure autoclave. Hot pressing of titanium oxide under non-oxidising conditions is taught in U.S. Pat. No. 3,639,132. For example, hollow encapsulating preforms, such as glass preforms, can be filled with the Magneli phase powder, and the powder then "hipped" under the defined conditions of temperature and pressure to produce high density shaped non-wicking corrosion resistant components.

One ready way of assessing whether the end product has porosity so that it will wick when in contact with electrolyte is by measuring density. For the purposes of this invention we prefer a density of greater than 4 $g/cm^3$. Another practical method of determining whether the product will be non-wicking is by measuring the time of evaporation or dispersal of a water drop on the surface of the material. A clean glass plate is used as a control for comparison. Using a dropper, a similar sized drop of de-ionised water is placed on the glass plate and the sample under test. In a normally heated room, such a droplet will take 20–30 minutes to evaporate from the glass. If the droplet on the test sample disappears much faster than the droplet on the glass, for example in less than half the time, then it is too porous. If the droplet remains on the glass and the sample for about the same time, then the sample is considered to be sufficiently non-porous within the meaning of the invention. This test can also be performed using an alcohol such as butanol instead of deionised water. In this case, both droplets will disappear much more quickly, but the difference in rate between the glass control and the sample will still be very marked if the sample is too porous.

The invention is capable of variation. For example the starting Magneli powder may be relatively porous and carbon powder can be used as a reducing agent. Residues of carbon may be left and they keep the titanium suboxide from being reoxidized by trace oxygen in the inert blanket gas during heat treatment. (The organic binder used to make the preforms may also leave trace carbon residues). Lower oxides (such as $Ti_3O_5$) may be present in the Magneli phase starting powder, so long as higher oxides are present to equilibrate with the lower oxides. The material may also be modified by the inclusion with the powder of impurities which are desirable in particular circumstances, for example, for high temperature stability. Thus, for example, chromium, copper, nickel, platinum, tantalum, zinc, magnesium, ruthenium, iridium, niobium or vanadium or a mixture of two or more of these may be included.

The invention provides in other aspects the following:

a shaped article comprising suboxides of titanium and being characterised by being both non-wicking and corrosion-resistant in use and adapted or shaped for use as an electrode or other component of electrochemical or electrical apparatus a powder ground from an article, e.g. a tile, made by any of the methods disclosed herein a thin preform as disclosed herein.

In order that the invention may be well understood it will now be described by way of illustration with reference to the following example:

EXAMPLE

A 10 cm square tile preform was produced by uniaxially pressing Magneli powder of grain size between 1 and 80 microns under a workpiece pressure of 3000 psi under nitrogen. The temperature was gradually raised to 1150° C. and held there for 3 hours. The product had a density greater than 4.0 g/cm$^3$, and was pore-free and so non-permeable to liquids. The tile was then immersed in 1% HF solution, at ambient temperature for 120 hours without failure so showing good resistance to chemical corrosion.

A parallel tile was prepared from the same starting powder and was treated in the same way but at 1250° C. This density of the product was even higher (4.2 g/cm$^3$). In the same immersion in 1% HF this sample crumbled in less than 40 hours. Without wishing to be restricted by this theory it is postulated that this reduced resistance to corrosion is caused by grain growth at the higher temperature, which tends to concentrate impurities at the grain boundaries. Since these impurities do not have the same corrosion resistance as the bulk TiO$_x$, they are corroded faster, and hence weaken the whole structure to the extent that it crumbles. By controlling the temperature and pressure of the heat treatment such as disclosed in this invention such grain growth can be suppressed. As a result the material is porefree and non-wicking.

The article illustrated in the example is a tile. That may be used as such or joined to other elements to form an industrially useful article, e.g. an electrode. Alternatively the tile may be ground to provide a dense non-porous powder which may be formed into other articles.

I claim:

1. A method of making an article comprising a suboxide of titanium, the method comprising binding Magneli phase powder into the shape of the article and subjecting the bonded shape to heat treatment carried out at a temperature of from about 1100° C. to about 1200° C. and a pressure of about 3000 to about 5000 psi and over a period of from about 3 to about 6 hours whereby the heat treated article is substantially corrosion resistant and non-wicking in use.

2. A method according to claim 1 including a preliminary step of preparing powdered Magneli phase titanium suboxide by reducing titania using hydrogen or carbon, combining the reduced powder with a low residue binder, and forming the resultant shape to form a preform and then holding the preform at about 300° C. at slightly elevated pressure for sufficient time to remove the binder and then subjecting the bonded shape to the heat treatment.

3. A method according to claim 1 wherein the titanium suboxide powder comprises particles having an average diameter between 1 and 80 micron.

4. A method according to claim 3 wherein the average diameter is between about 1 and 15 microns.

5. A method according to claim 1 including a binder as a polymer in a solvent therefor.

6. A method according to claim 1 including a preform as a tape which is pressed between the platens of a uniaxial press and the heat treatment is carried out while the tape is so pressed.

7. A method according to claim 1 wherein the shape is a plate-like preform which is encapsulated or the surface pores are sealed and the preform is subjected to hot isostatic pressing in a high pressure autoclave.

8. A method according to claim 7 wherein a hollow encapsulating preform is filled with the powder, and the powder then hot isostatically pressed to produce a high density shaped non-wicking corrosion resistant component.

9. A method according to claim 1 including grinding the formed product into a powder.

10. A method according to claim 1 wherein the pressure is from 3000 to 3500 psi.

* * * * *

UNITED STATES PATENT AND TRADEMARK OFFICE
CERTIFICATE OF CORRECTION

PATENT NO.  : 5,733,489
DATED       : March 31, 1998
INVENTOR(S) : Andrew Hill

It is certified that error appears in the above-identified patent and that said Letters Patent are hereby corrected as shown below:

On the title page, item [73], insert the following:

--Assignee:  Altraverda Limited
             Sheffield S31 9FH, Great Britain--.

Signed and Sealed this

Seventeenth Day of November, 1998

Attest:

BRUCE LEHMAN

Attesting Officer

Commissioner of Patents and Trademarks

UNITED STATES PATENT AND TRADEMARK OFFICE
CERTIFICATE OF CORRECTION

PATENT NO.   : 5,733,489
DATED        : March 31, 1998
INVENTOR(S)  : Andrew Hill It is certified that error appears in the above-identified patent and that said Letters Patent are hereby corrected as shown below:

On the title page, item [73], insert the following:

--Assignee:   Atraverda Limited
              Darenth House
              Rotheram Road, Eckington
              Sheffield S31 9FH, Great Britain This certificate supersedes Certificate of Correction issued November 17, 1998.

Signed and Sealed this

Sixteenth Day of March, 1999

Attest:

Attesting Officer

Q. TODD DICKINSON

Acting Commissioner of Patents and Trademarks